(12) United States Patent
Catovic et al.

(10) Patent No.: US 8,638,679 B2
(45) Date of Patent: Jan. 28, 2014

(54) METHOD AND APPARATUS THAT FACILITATES AUTOMATIC ASSISTANCE FOR POSITIONING OF ACCESS POINT BASE STATIONS

(75) Inventors: Amer Catovic, San Diego, CA (US); Rajarshi Gupta, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 12/787,726

(22) Filed: May 26, 2010

(65) Prior Publication Data

US 2010/0302965 A1 Dec. 2, 2010

Related U.S. Application Data

(60) Provisional application No. 61/181,874, filed on May 28, 2009.

(51) Int. Cl.
*G01R 31/08* (2006.01)

(52) U.S. Cl.
USPC .......................................... 370/252; 455/418

(58) Field of Classification Search
USPC ....................................................... 370/252
See application file for complete search history.

(56) References Cited

U.S. PATENT DOCUMENTS

| 2004/0214577 | A1* | 10/2004 | Borst et al. | 455/446 |
|---|---|---|---|---|
| 2009/0131049 | A1* | 5/2009 | Osborn | 455/435.1 |
| 2009/0147697 | A1* | 6/2009 | Malik et al. | 370/254 |
| 2010/0292599 | A1* | 11/2010 | Oleson et al. | 600/519 |
| 2011/0300842 | A1* | 12/2011 | Bjorken | 455/418 |

FOREIGN PATENT DOCUMENTS

| EP | 2009941 | | 12/2008 |
|---|---|---|---|
| JP | 2001352287 | A | 12/2001 |
| JP | 2004201269 | A | 7/2004 |
| JP | 2006100884 | A | 4/2006 |
| JP | 2007129274 | A | 5/2007 |
| JP | 2008258850 | A | 10/2008 |
| JP | 2010537475 | A | 12/2010 |
| JP | 2011151700 | A | 8/2011 |
| WO | WO 2008109842 | | 9/2008 |
| WO | WO 2009022952 | | 2/2009 |

OTHER PUBLICATIONS

International Search Report—PCT/US2010/036744—International Search Authority, European Patent Office, Aug. 31, 2010.
Written Opinion—PCT/US2010/036744—ISA/EPO—Aug. 31, 2010.
Taiwan Search Report—TW099117286—TIPO—Aug. 26, 2013.

* cited by examiner

*Primary Examiner* — Sai-Ming Chan
(74) *Attorney, Agent, or Firm* — François A. Pelaez

(57) ABSTRACT

Aspects are disclosed for positioning an access point base station. In a particular aspect, a performance parameter of a communication between a user equipment and the access point base station is monitored. A position of the access point base station is then assessed based on the performance parameter, and an assessment of the location is subsequently communicated.

66 Claims, 12 Drawing Sheets

METHOD AND APPARATUS THAT FACILITATES AUTOMATIC ASSISTANCE FOR POSITIONING OF ACCESS POINT BASE STATIONS

CROSS-REFERENCE TO RELATED APPLICATIONS

This application claims the benefit of U.S. Provisional Patent Application Ser. No. 61/181,874 entitled "Automatic Assistance for Positioning of Access Point Base Stations," which was filed May 28, 2009. The aforementioned application is herein incorporated by reference in its entirety.

BACKGROUND

I. Field

The following description relates generally to wireless communications, and more particularly to methods and apparatuses that facilitate positioning of an access point base station.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Miniaturized base stations known as access point base stations (also known as femto cells, Home Node Bs (HNBs), etc.) have been developed to extend cellular coverage inside buildings. Access point base stations are a class of base stations, which may be installed in a user's home and provide indoor wireless coverage to mobile units using existing broadband Internet connections. To this end, it is noted that an access point base station may be placed in any of various locations within the home by its owner, wherein a sub-optimal location may be undesirable. For instance, an access point base station that is placed in an obstructed location (e.g., under a metal chest of drawers) may not be able to provide adequate coverage within the home. Similarly, an access point base station placed in an overexposed location (e.g. on a window sill) may cause/experience interference with respect to nearby user equipment, macro base stations, and/or other network entities. Conventional access point base stations, however, do not provide a mechanism for indicating whether a current location of the access point base station is adequate and/or for identifying particular problems with the location.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with providing automatic assistance for positioning of access point base stations. In one aspect, methods and computer program products are disclosed that facilitate positioning of an access point base station. These embodiments include monitoring a performance parameter of a communication between a user equipment and the access point base station. These embodiments also include assessing a position of the access point base station based on the performance parameter.

In another aspect, an apparatus configured to facilitate positioning of an access point base station is disclosed. Within such embodiment, the apparatus includes a processor configured to execute computer executable components stored in memory. The computer executable components include a communication component, a performance component, and an assessment component. The communication component is configured to facilitate a communication between a user equipment and an access point base station, whereas the performance component is configured to monitor a performance parameter associated with the communication. The assessment component is then configured to assess a position of the access point base station based on the performance parameter.

In a further aspect, another apparatus is disclosed. Within such embodiment, the apparatus includes means for monitoring and means for assessing. For this embodiment, the means for monitoring is configured to monitor a performance parameter of a communication between a user equipment and an access point base station, whereas the means for assessing is configured to assess a position of the access point base station based on the performance parameter. In an aspect, the means for monitoring may further include a means for ascertaining a communication quality between the user equipment and the access point base station. Within such embodiment, the performance parameter is based on a metric associated with the communication quality. In another aspect the means for monitoring may further include a means for ascertaining a transmit power utilized by the access point base station, wherein the performance parameter is based on a metric associated with the transmit power. For this particular embodiment, the means for ascertaining may then further include a means for performing a comparison between the transmit power utilized by the access point base station and a corresponding received power at the user equipment, wherein the performance parameter is based on the comparison.

In another aspect, other methods and computer program products for positioning of an access point base station are disclosed. For these embodiments, a location of the access point base station is assessed. An assessment of the location is then communicated.

Another apparatus for positioning an access point base station is also disclosed. Within such embodiment, the apparatus includes a processor configured to execute computer executable components stored in memory. The computer executable components include an assessment component and a communication component. The assessment component is configured to assess a position of the access point base station. The communication component is then configured to communicate an assessment of the position.

In a further aspect, another apparatus is disclosed. Within such embodiment, the apparatus includes means for assessing and means for communicating. For this embodiment, the means for assessing is configured to assess a position of the access point base station, whereas the means for communicating is configured to communicate an assessment of the position. In an aspect, the means for communicating further includes a means for providing a light indication, wherein the means for providing may further include a means for flashing the light indication according to a flash frequency associated with the assessment, and/or a means for flashing the light indication according to a color scheme associated with the assessment. In another aspect, the means for communicating includes a means for providing an audio indication, wherein the means for providing may further include a means for beeping the audio indication at a beep frequency associated with the assessment.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
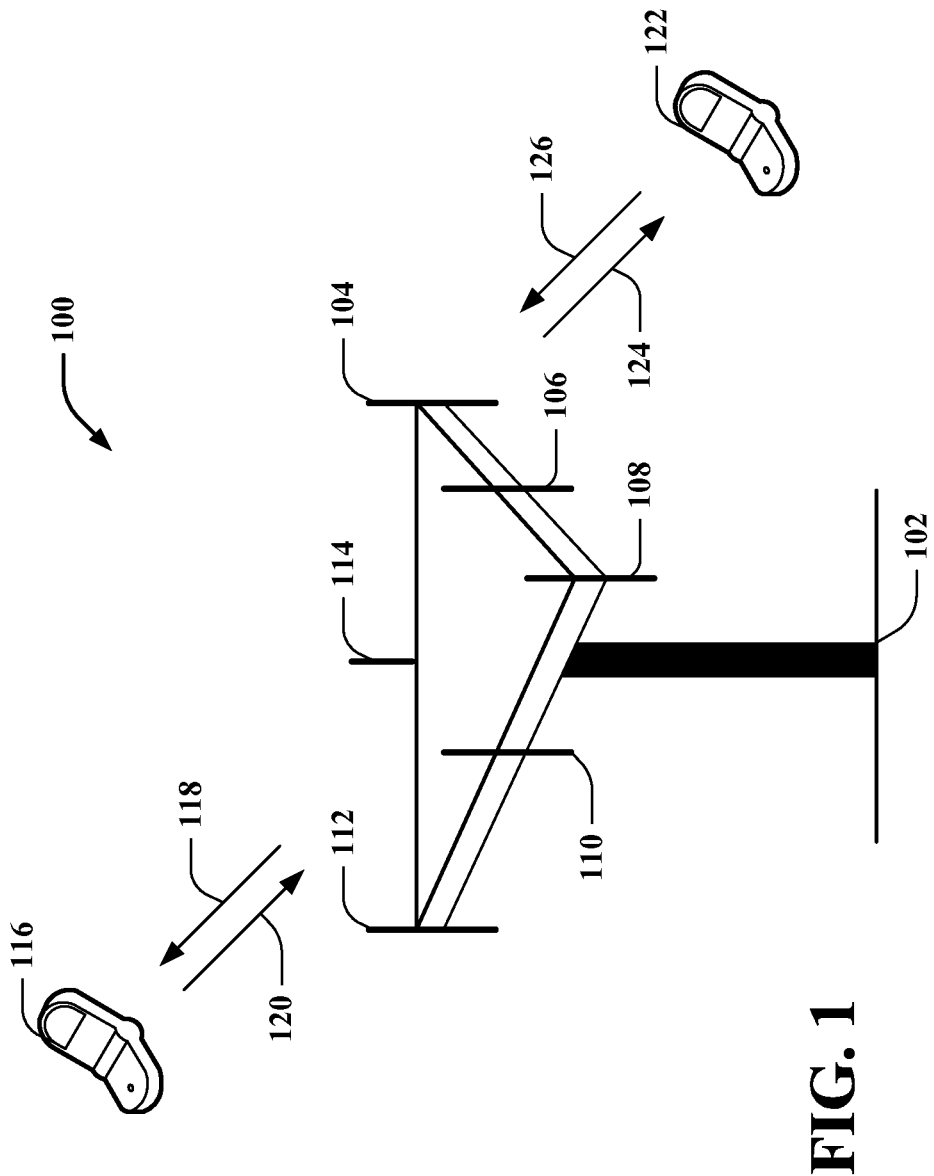
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification is directed towards positioning of an access point base station (also referred to as a "femto cell"). Moreover, exemplary embodiments are disclosed which facilitate having a femto cell identify whether it is placed in a sub-optimal location. For instance, in one embodiment, the femto cell is configured to communicate an evaluation of the location to a user via a short message service (SMS) message and/or email. In another embodiment, the femto cell is configured to provide such assessment to the operation and maintenance (OAM) system.

To this end, it is noted that the techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), access point base station, or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
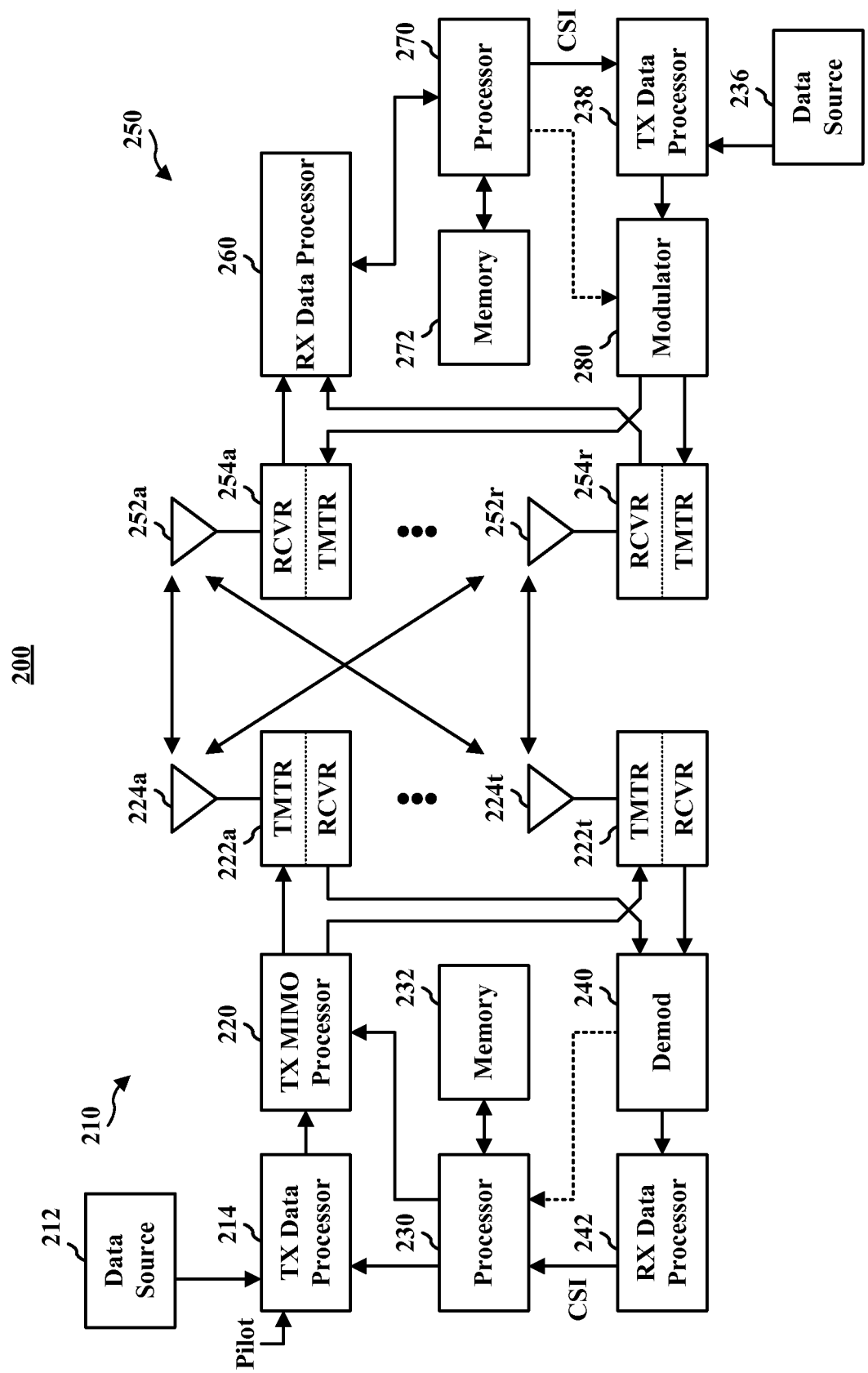
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
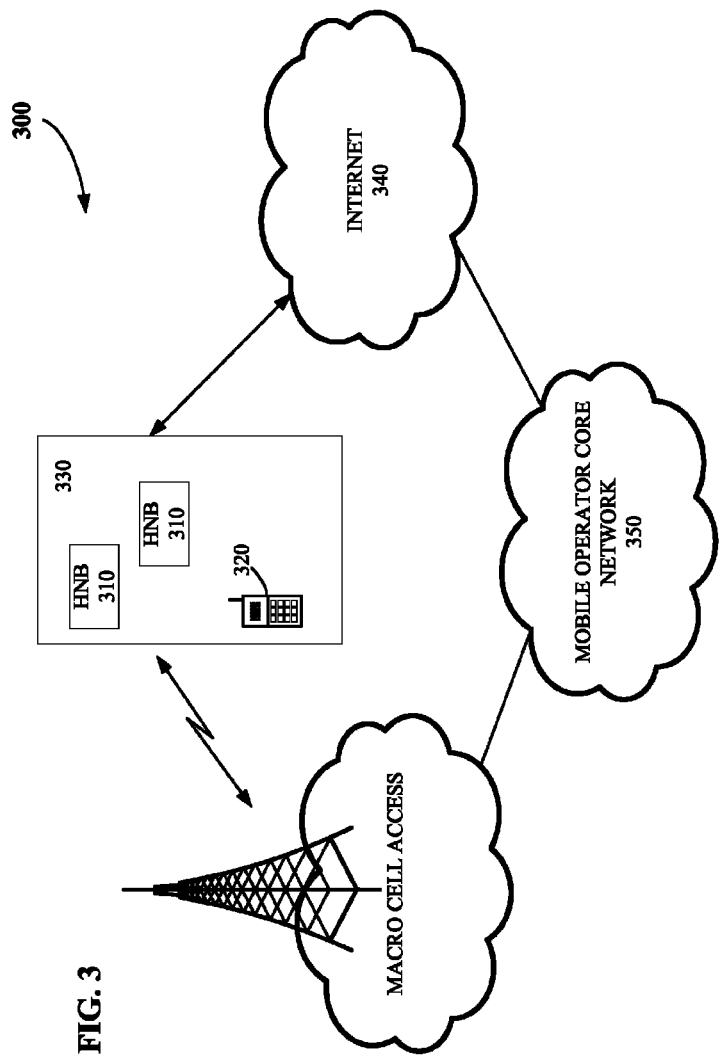
FIG. 3 illustrates an exemplary communication system that enables deployment of access point base stations within a network environment.

FIG. 3 illustrates an exemplary communication system to enable deployment of access point base stations within a network environment. As shown in FIG. 3, the system 300 includes multiple access point base stations or, in the alternative, femto cells, Home Node B units (HNBs), or Home evolved Node B units (HeNBs), such as, for example, HNBs 310, each being installed in a corresponding small scale network environment, such as, for example, in one or more user residences 330, and being configured to serve associated, as well as alien, user equipment (UE) or mobile stations 320. Each HNB 310 is further coupled to the Internet 340 and a mobile operator core network 350 via a DSL router (not shown) or, alternatively, a cable modem (not shown).

Figure 4:
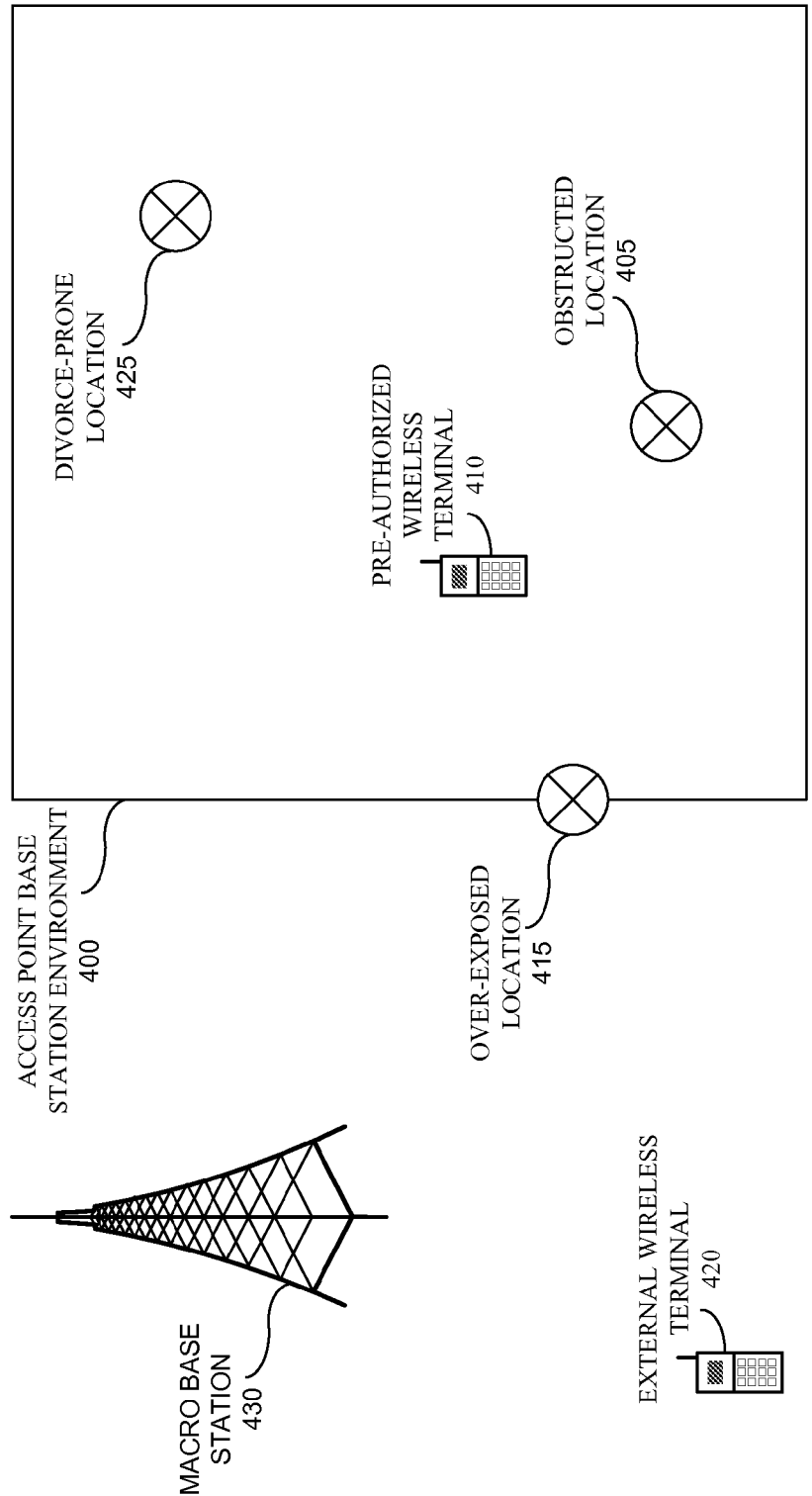
FIG. 4 is an illustration of an exemplary system that facilitates positioning of an access point base station according to an embodiment.

Referring next to FIG. 4, an exemplary system that facilitates positioning of an access point base station according to an embodiment is provided. As illustrated, an exemplary access point base station environment 400, such as a home or office, may include various candidate locations 405, 415, or 425, from which an access point base station may provide cellular coverage to pre-authorized wireless terminal 410. Here, however, it is noted that different types of performance results may be realized by placing the access point base station in the various candidate locations 405, 415, or 425.

For instance, a first performance result type may suggest that the access point base station is in an obstructed location 405 (e.g., under a metal chest of drawers). To facilitate identifying whether an access point base station is in an obstructed location 405, the access point base station may monitor a transmit power utilized by the access point base station. Indeed, since the access point base station may be forced to transmit at a high end of the power range when in an obstructed location 405, tracking transmit power may be an effective way to identify when the access point base station is placed in such an obstructed location 405. The access point base station may also identify an obstructed location 405 according to how frequently it performs handovers, even when pre-authorized wireless terminal 410 associates with it. Once the user is notified of obstructed location 405, the user may address the situation accordingly by, for example, moving the access point base station to a more centralized location and/or away from an area with undesirable radio frequency blockages (e.g., walls, large appliances, etc.).

In another aspect, a second performance result type may suggest that the access point base station is in an over-exposed location 415 (e.g., on a window sill). To facilitate identifying whether an access point base station is in an over-exposed location 415, the access point base station may again monitor a transmit power. Here, since the access point base station may be forced to transmit at a low end of the power range due to interference/power control messages from neighboring access point base stations, external wireless terminal 420, and/or macro base station 430, detecting such performance results may suggest an over-exposed location 415. An over-exposed location 415 may also be inferred where pre-authorized wireless terminal 410 remains associated, but a significant number of handovers are performed with external wireless terminal 420 (assuming the access point base station is operated with open access). Upon notification of an over-exposed location 415, a user may then address the situation by, for example, moving the access point base station to a more centralized location and/or away from the exposed area (e.g., away from the window or vicinity of public space).

In yet another aspect, a third performance result type may suggest that the access point base station is in a divorce-prone location 425 (e.g., an area of the house infrequently occupied by the user). Indeed, the access point base station may often be ready for pre-authorized wireless terminal 410, but rarely sees it while in divorce-prone location 425. To facilitate identifying whether an access point base station is in a divorce-prone location 425, the access point base station may monitor a number of handovers performed with pre-authorized wireless terminal 410 since such handovers may occur sooner and more frequently, despite having pre-authorized wireless terminal 410 detected by the access point base station. Upon notification of a divorce-prone location 425, a user may then address the situation by, for example, moving the access point base station closer to a room where pre-authorized wireless terminal 410 is normally used (e.g. laptop used in home office) and/or having pre-authorized wireless terminal 410 not make full usage of femto capabilities.

Figure 5:
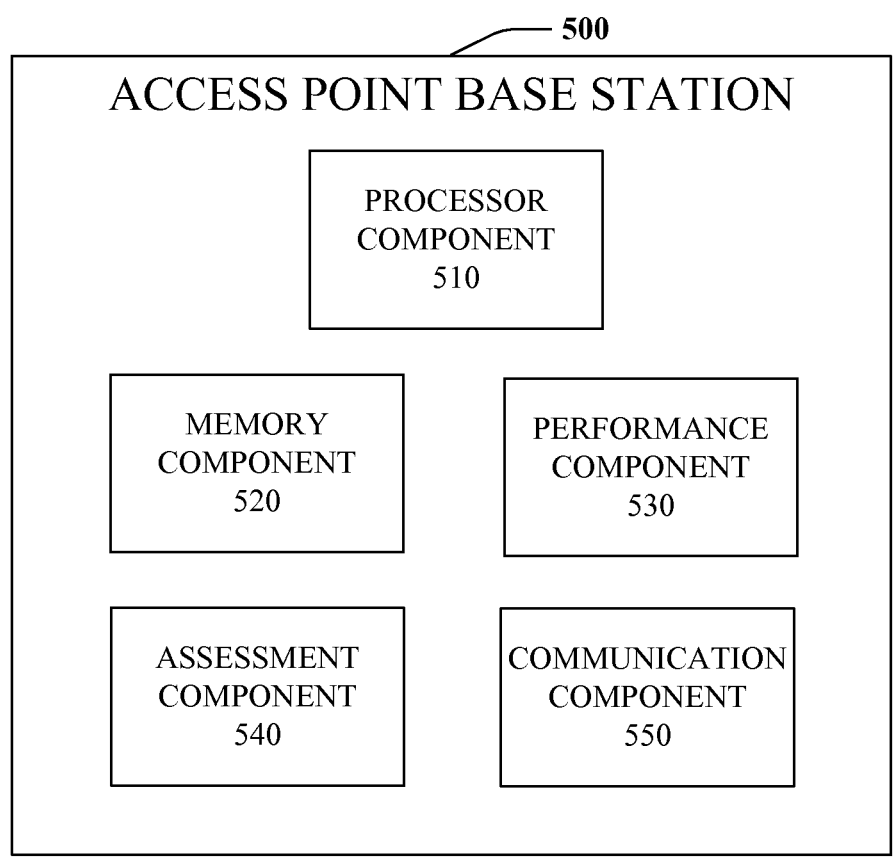
FIG. 5 illustrates a block diagram of an exemplary access point base station that facilitates positioning of the access point base station in accordance with an aspect of the subject specification.

Referring next to FIG. 5, a block diagram of an exemplary access point base station that facilitates positioning of the access point base station is provided. As shown, access point base station 500 may include processor component 510, memory component 520, performance component 530, assessment component 540, and communication component 550.

In one aspect, processor component 510 is configured to execute computer-readable instructions related to performing any of a plurality of functions. Processor component 510 can be a single processor or a plurality of processors dedicated to analyzing information to be communicated from access point base station 500 and/or generating information that can be utilized by memory component 520, performance component 530, assessment component 540, and/or communication component 550. Additionally or alternatively, processor component 510 may be configured to control one or more components of access point base station 500.

In another aspect, memory component 520 is coupled to processor component 510 and configured to store computer-readable instructions executed by processor component 510. Memory component 520 may also be configured to store any of a plurality of other types of data including generated by any of performance component 530, assessment component 540, and/or communication component 550. Memory component 520 can be configured in a number of different configurations, including as random access memory, battery-backed memory, hard disk, magnetic tape, etc. Various features can also be implemented upon memory component 520, such as compression and automatic back up (e.g., use of a Redundant Array of Independent Drives configuration).

As illustrated, access point base station 500 may also include performance component 530. Within such embodiment, performance component 530 is configured to monitor a performance parameter of a communication between access point base station 500 and at least one user equipment. Here, it should be noted that performance component 530 can monitor performances associated with any of a plurality of scenarios. For instance, in a first exemplary scenario, performance component 530 is configured to monitor a performance consistent with having access point base station 500 in an obstructed location. To facilitate identifying such scenario, performance component 530 may be configured to ascertain a transmit power utilized by access point base station 500, wherein the performance parameter is based on a metric associated with the transmit power. Within such embodiment, performance component 530 may be further configured to perform a comparison between the transmit power utilized by access point base station 500 and a corresponding received power at the user equipment, wherein the performance parameter is based on the comparison.

In another aspect, performance component 530 facilitates determining that access point base station 500 is in an obstructed location based on communication quality. For instance, performance component 530 may be configured to ascertain a communication quality between the user equipment and access point base station 500, wherein the performance parameter is based on a metric associated with the communication quality. Within such embodiment, the communication quality may be associated with any of a plurality of characteristics. For example, the communication quality can be associated with a number of dropped communications, a data throughput, and/or a connection setup time.

For some aspects, performance component 530 may also facilitate determining whether access point base station 500 is in an over-exposed location. For instance, performance component 530 may be configured to ascertain an interference level detected at access point base station 500, wherein the performance parameter is based on a metric associated with the interference level.

An over-exposed location may also be ascertained by monitoring handovers performed on external user equipment (i.e., user equipment not pre-authorized to utilize access point base station 500). For instance, performance component 530 may be configured to ascertain a number of handovers performed on entities outside of a set of pre-authorized user equipment, wherein the performance parameter is based on a metric associated with the number of handovers performed on these entities outside of the set of pre-authorized user equipment.

Performance component 530 may also be configured to facilitate determining whether access point base station 500 is in a divorce-prone location. For instance, performance component 530 may be configured to monitor handovers performed on entities included in the set of pre-authorized user equipment. Moreover, performance component 530 may be configured to ascertain a number of handovers performed on entities within the set of pre-authorized user equipment, wherein the performance parameter is based on a metric associated with the number of handovers performed on those entities within the set of pre-authorized user equipment.

As illustrated, access point base station 500 may further include assessment component 540. Within such embodiment, assessment component 540 is configured to assess a position of access point base station 500 based on the performance parameter monitored by performance component 530. For instance, assessment component 540 may be configured to ascertain whether a position is an adequate position and/or a sub-optimal position. For example, to ascertain whether a position is "adequate" for allowing access point base station 500 to perform at an acceptable level, assessment component 540 may be configured to make a comparison between the performance parameter monitored by performance component 530 and a pre-determined performance threshold. Here, it should be noted that, although a position may be "adequate" it may not be "optimal" relative to another position. Accordingly, it is contemplated that assessment component 540 may also be configured to ascertain whether a position is a sub-optimal position (e.g., by tracking a performance history of various positions/locations).

In yet another aspect, access point base station 500 includes communication component 550, which is coupled to processor component 510 and configured to interface access point base station 500 with external entities. For instance, communication component 550 may be configured to communicate an assessment of a position ascertained by assessment component 540 via any of a plurality of communication schemes. In an aspect, communication component 550 may be configured to provide a light indication and/or an audio indication to communicate various assessments. For example, with respect to a light indication embodiment, communication component 550 may be configured to flash a light indication according to a flash frequency and/or color scheme associated with a corresponding assessment. An exemplary audio indication embodiment may then include having communication component 550 configured to beep an audio indication at a beep frequency associated with a corresponding assessment.

It should be further noted that assessments ascertained by assessment component 540 may be provided to external entities. For example, communication component 550 may be configured to transmit an assessment directly to a user and/or third party via least one of an e-mail or a short message service. In other embodiments, however, it may be desirable to configure communication component 550 to provide assessments to a network entity associated with access point base station 500, wherein the network entity may subsequently forward and/or store the assessments accordingly.

In yet another aspect, it should be noted that particular assessment-related details may be communicated via communication component 550. For instance, communication component 550 may be configured to indicate whether a location is a sub-optimal location. With respect to communicating whether a particular position is an adequate position, communication component 550 may be configured to indicate whether a performance parameter associated with the position exceeds a performance threshold. Furthermore, since access point base station 500 may experience various types of problems, communication component 550 may be included which is configured to indicate a particular problem type associated with a position (e.g., indicating whether the position is an obstructed location, an over-exposed location, and/or a divorce-prone location).

Figure 6:
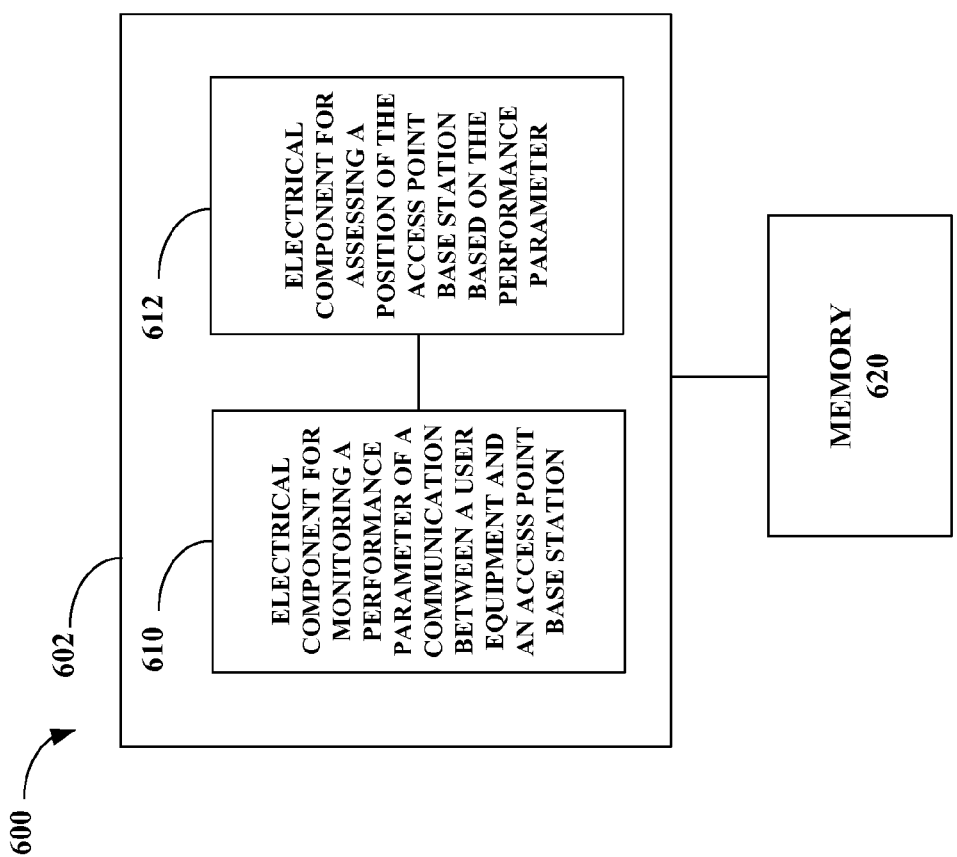
FIG. 6 is an illustration of an exemplary coupling of electrical components that effectuate positioning of an access point base station.

Turning to FIG. 6, illustrated is a system 600 that facilitates positioning of an access point base station according to an embodiment. System 600 and/or instructions for implementing system 600 can reside within an access point base station (e.g., access point base station 500) or a computer-readable storage medium, for instance. As depicted, system 600 includes functional blocks that can represent functions implemented by a processor, software, or combination thereof (e.g., firmware). System 600 includes a logical grouping 602 of electrical components that can act in conjunction. As illustrated, logical grouping 602 can include an electrical component for monitoring a performance parameter of a communication between a user equipment and an access point base station 610. Logical grouping 602 can also include an electrical component for assessing a position of the access point base station based on the performance parameter 612. Additionally, system 600 can include a memory 620 that retains instructions for executing functions associated with electrical components 610 and 612, wherein any of electrical components 610 and 612 can exist either within or outside memory 620.

Figure 7:
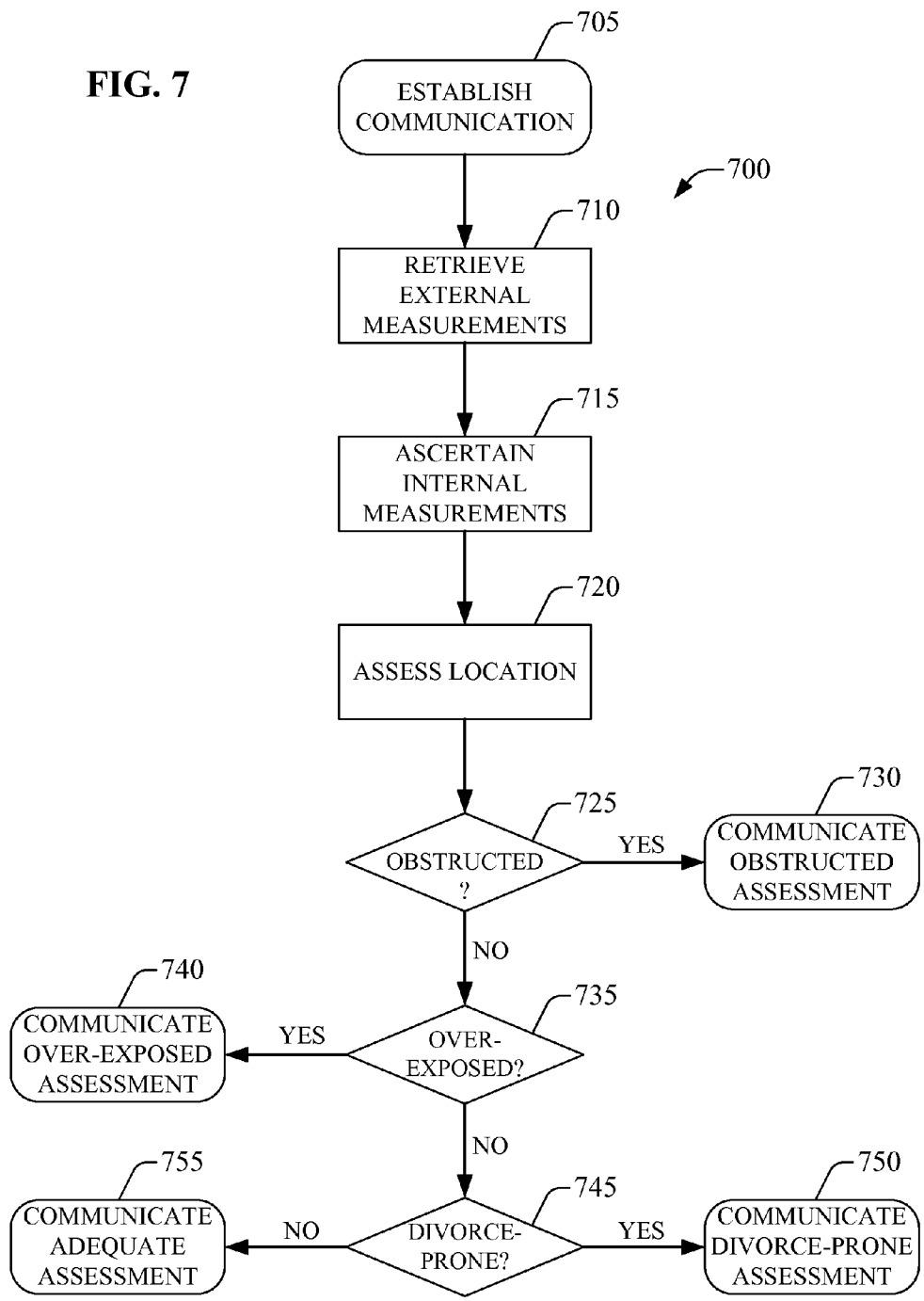
FIG. 7 is a flow chart illustrating an exemplary methodology that facilitates positioning of an access point base station in accordance with an aspect of the subject specification.

Referring next to FIG. 7, a flow chart illustrating an exemplary method that facilitates positioning of an access point base station is provided. As illustrated, process 700 includes a series of acts that may be performed by various components of an access point base station (e.g., access point base station 500) according to an aspect of the subject specification. Process 700 may be implemented by employing at least one processor to execute computer executable instructions stored on a computer readable storage medium to implement the series of acts. In another embodiment, a computer-readable storage medium comprising code for causing at least one computer to implement the acts of process 700 are contemplated.

In an aspect, process 700 begins with the access point base station establishing a communication with a pre-authorized wireless terminal at act 705. Next, at act 710, the access point base station then retrieves external measurements taken by the wireless terminal (e.g., a received power at the wireless terminal, etc.). Internal measurements taken by the access point base station (e.g., a transmit power utilized by the access point base station, etc.) are then ascertained at act 715.

Once the access point base station has obtained the external and/or internal measurements, process 700 may proceed to act 720 where an assessment of the access point base station's location is performed. As stated previously, such an assessment may include determining whether a particular scenario corresponds to a performance type characterized by the external/internal measurements. For instance, at act 725, process 700 may determine whether the external/internal measurements are indicative of an obstructed location, wherein such an assessment is subsequently communicated at act 730. However, if an obstructed location is not inferred, process 700 continues to act 735 where the access point base station determines whether the external/internal measurements are indicative of an over-exposed location. If an over-exposed location is inferred, an assessment indicating that the access point base station is in an over-exposed location is communicated at act 740.

If neither an over-exposed location nor an obstructed location is inferred, process 700 proceeds to act 745 to determine whether the external/internal measurements are indicative of a divorce-prone location. If a divorce-prone location is indeed inferred, an assessment indicating such location is subsequently communicated at act 750. Otherwise, if a divorce-prone location is not inferred, an assessment indicating that the location is an adequate location is subsequently communicated at act 755.

Figure 8:
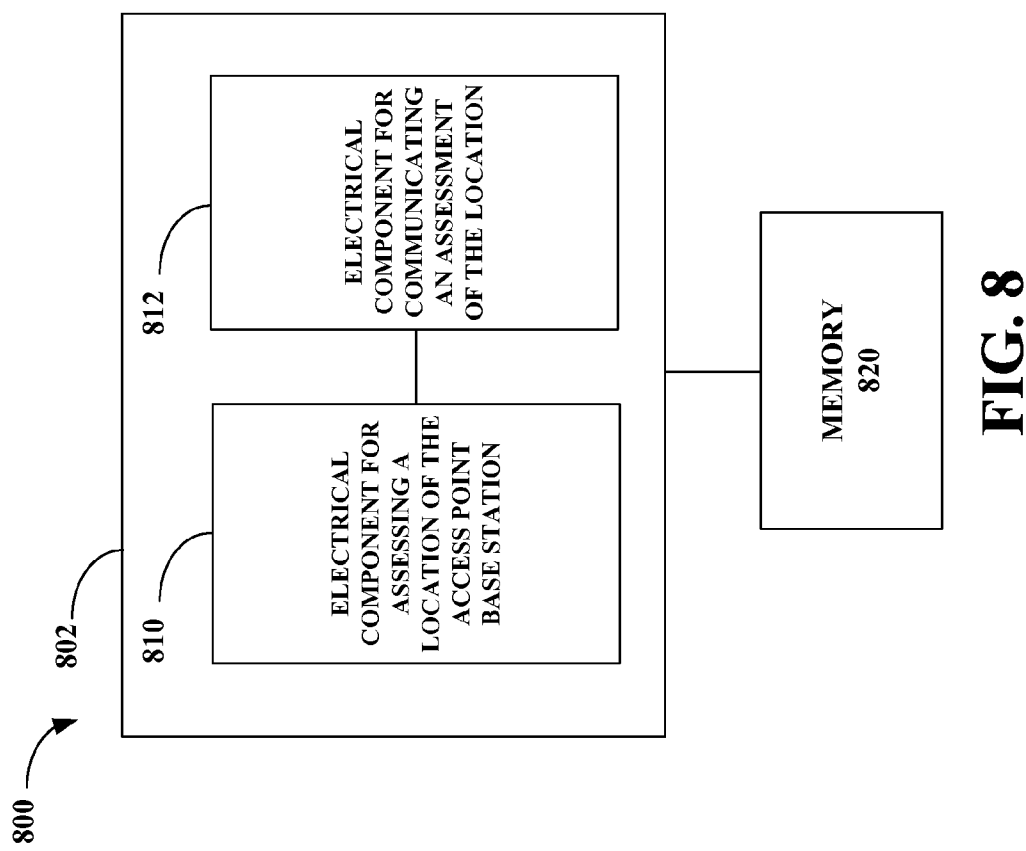
FIG. 8 is an illustration of another exemplary coupling of electrical components that effectuate positioning of an access point base station.

Referring next to FIG. 8, illustrated is another system 800 that facilitates positioning of an access point base station according to an embodiment. System 800 and/or instructions for implementing system 800 can also reside within an access point base station (e.g., access point base station 500) or a computer-readable storage medium, for instance, wherein system 800 includes functional blocks that can represent functions implemented by a processor, software, or combination thereof (e.g., firmware). Moreover, system 800 includes a logical grouping 802 of electrical components that can act in conjunction similar to logical grouping 602 in system 600. As illustrated, logical grouping 802 can include an electrical component for assessing a location of the access point base station 810. Logical grouping 802 can also include an electrical component for communicating an assessment of the location 812. Additionally, system 800 can include a memory 820 that retains instructions for executing functions associated with electrical components 810 and 812, wherein any of electrical components 810 and 812 can exist either within or outside memory 820.

Figure 9:
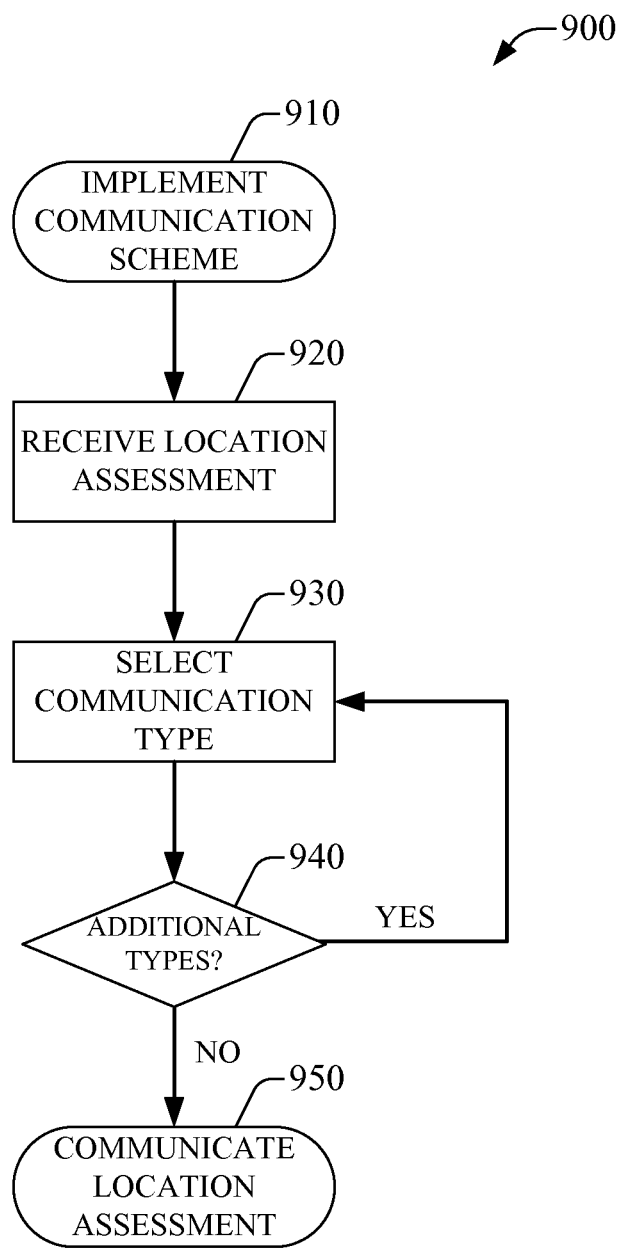
FIG. 9 is a flow chart illustrating another exemplary methodology that facilitates positioning of an access point base station in accordance with an aspect of the subject specification.

Referring next to FIG. 9, a flow chart illustrating an exemplary method that facilitates positioning of an access point base station is provided. As illustrated, process 900 includes a series of acts that may be performed by various components of an access point base station (e.g., access point base station 500) according to an aspect of the subject specification. Process 900 may be implemented by employing at least one processor to execute computer executable instructions stored on a computer readable storage medium to implement the series of acts. In another embodiment, a computer-readable storage medium comprising code which causes at least one computer to implement the acts of process 900 are contemplated.

In an aspect, process 900 begins with the implementation of at least one communication scheme for communicating the adequacy of a particular access point base station is implemented at act 910. In an aspect, such communication scheme(s) may be provided by a user (e.g., via a user profile indicating particular communication preferences). In another aspect, a default communication scheme may be implemented.

Next, at act 920, process 900 proceeds with the access point base station receiving an assessment of the access point base station's current location. A communication type for communicating the received assessment is then selected at act 930. Here, it is noted that the particular communication scheme implemented by the access point base station may direct the access point base station to provide the assessment to multiple destinations (e.g., to the user and the network). Accordingly, process 900 may then continue to act 940 where the access point base station determines whether additional communication types should be selected. If additional communication types are needed, process 900 loops back to act 930 where the additional communication type is selected. Otherwise, if no additional communication types are needed, process 900 concludes at act 950 where the location assessment is communicated to the appropriate destination.

Exemplary Communication System

Figure 10:
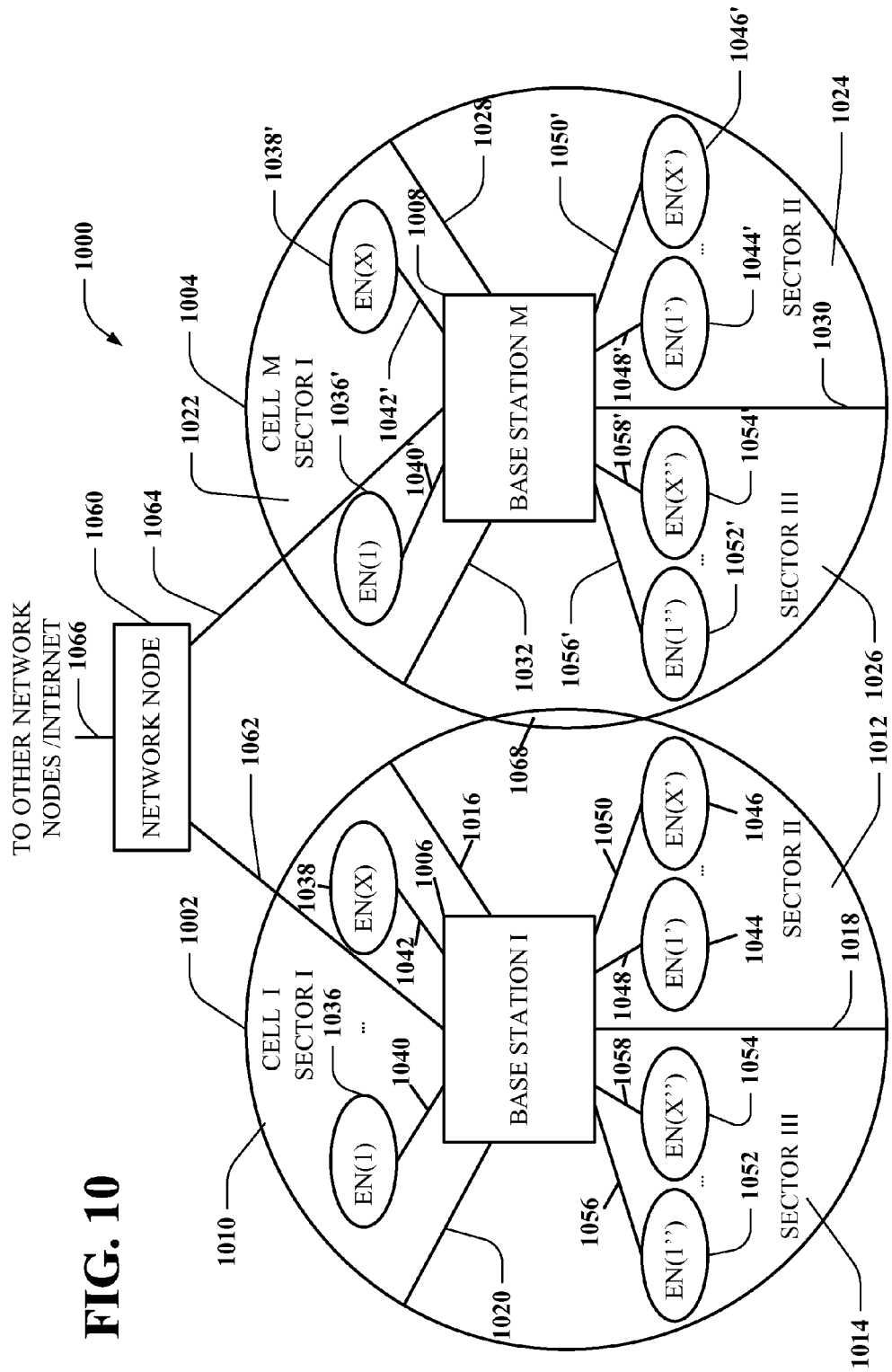
FIG. 10 is an illustration of an exemplary communication system implemented in accordance with various aspects including multiple cells.

Referring next to FIG. 10, an exemplary communication system 1000 implemented in accordance with various aspects is provided including multiple cells: cell I 1002, cell M 1004. Here, it should be noted that neighboring cells 1002, 1004 overlap slightly, as indicated by cell boundary region 1068, thereby creating potential for signal interference between signals transmitted by base stations in neighboring cells. Each cell 1002, 1004 of system 1000 includes three sectors. Cells which have not been subdivided into multiple sectors (N=1), cells with two sectors (N=2) and cells with more than 3 sectors (N>3) are also possible in accordance with various aspects. Cell 1002 includes a first sector, sector I 1010, a second sector, sector II 1012, and a third sector, sector III 1014. Each sector 1010, 1012, and 1014 has two sector boundary regions; each boundary region is shared between two adjacent sectors.

Sector boundary regions provide potential for signal interference between signals transmitted by base stations in neighboring sectors. Line 1016 represents a sector boundary region between sector I 1010 and sector II 1012; line 1018 represents a sector boundary region between sector II 1012 and sector III 1014; line 1020 represents a sector boundary region between sector III 1014 and sector I 1010. Similarly, cell M 1004 includes a first sector, sector I 1022, a second sector, sector II 1024, and a third sector, sector III 1026. Line 1028 represents a sector boundary region between sector I 1022 and sector II 1024; line 1030 represents a sector boundary region between sector II 1024 and sector III 1026; line 1032 represents a boundary region between sector III 1026 and sector I 1022. Cell I 1002 includes a base station (BS), base station I 1006, and a plurality of end nodes (ENs) in each sector 1010, 1012, 1014. Sector I 1010 includes EN(1) 1036 and EN(X) 1038 coupled to BS 1006 via wireless links 1040, 1042, respectively; sector II 1012 includes EN(1') 1044 and EN(X') 1046 coupled to BS 1006 via wireless links 1048, 1050, respectively; sector III 1014 includes EN(1") 1052 and EN(X") 1054 coupled to BS 1006 via wireless links 1056, 1058, respectively. Similarly, cell M 1004 includes base station M 1008, and a plurality of end nodes (ENs) in each sector 1022, 1024, and 1026. Sector I 1022 includes EN(1) 1036' and EN(X) 1038' coupled to BS M 1008 via wireless links 1040', 1042', respectively; sector II 1024 includes EN(1') 1044' and EN(X') 1046' coupled to BS M 1008 via wireless links 1048', 1050', respectively; sector 3 1026 includes EN(1") 1052' and EN(X") 1054' coupled to BS 1008 via wireless links 1056', 1058', respectively.

System 1000 also includes a network node 1060 which is coupled to BS I 1006 and BS M 1008 via network links 1062, 1064, respectively. Network node 1060 is also coupled to other network nodes, e.g., other base stations, AAA server nodes, intermediate nodes, routers, etc. and the Internet via network link 1066. Network links 1062, 1064, 1066 may be, e.g., fiber optic cables. Each end node, e.g. EN 1 1036 may be a wireless terminal including a transmitter as well as a receiver. The wireless terminals, e.g., EN(1) 1036 may move through system 1000 and may communicate via wireless links with the base station in the cell in which the EN is currently located. The wireless terminals, (WTs), e.g. EN(1) 1036, may communicate with peer nodes, e.g., other WTs in system 1000 or outside system 1000 via a base station, e.g. BS 1006, and/or network node 1060. WTs, e.g., EN(1) 1036 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 11:
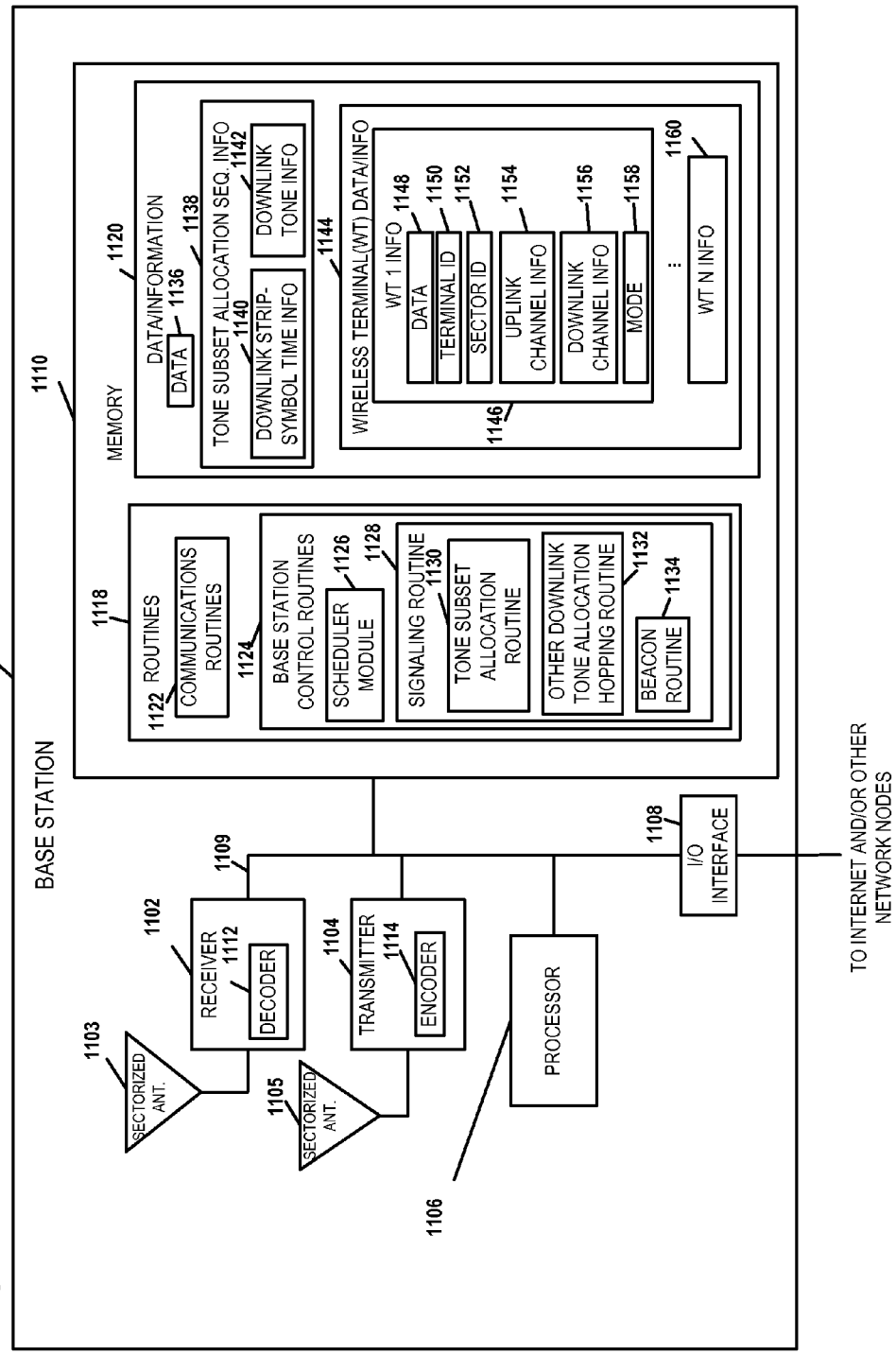
FIG. 11 is an illustration of an exemplary base station in accordance with various aspects described herein.

FIG. 11 illustrates an example base station 1100 in accordance with various aspects. Base station 1100 implements tone subset allocation sequences, with different tone subset allocation sequences generated for respective different sector types of the cell. Base station 1100 may be used as any one of base stations 1006, 1008 of the system 1000 of FIG. 10. The base station 1100 includes a receiver 1102, a transmitter 1104, a processor 1106, e.g., CPU, an input/output interface 1108 and memory 1110 coupled together by a bus 1109 over which various elements 1102, 1104, 1106, 1108, and 1110 may interchange data and information.

Sectorized antenna 1103 coupled to receiver 1102 is used for receiving data and other signals, e.g., channel reports, from wireless terminals transmissions from each sector within the base station's cell. Sectorized antenna 1105 coupled to transmitter 1104 is used for transmitting data and other signals, e.g., control signals, pilot signal, beacon signals, etc. to wireless terminals 1200 (see FIG. 12) within each sector of the base station's cell. In various aspects, base station 1100 may employ multiple receivers 1102 and multiple transmitters 1104, e.g., an individual receivers 1102 for each sector and an individual transmitter 1104 for each sector. Processor 1106, may be, e.g., a general purpose central processing unit (CPU). Processor 1106 controls operation of base station 1100 under direction of one or more routines 1118 stored in memory 1110 and implements the methods. I/O interface 1108 provides a connection to other network nodes, coupling the BS 1100 to other base stations, access routers, AAA server nodes, etc., other networks, and the Internet. Memory 1110 includes routines 1118 and data/information 1120.

Data/information 1120 includes data 1136, tone subset allocation sequence information 1138 including downlink strip-symbol time information 1140 and downlink tone information 1142, and wireless terminal (WT) data/info 1144 including a plurality of sets of WT information: WT 1 info 1146 and WT N info 1160. Each set of WT info, e.g., WT 1 info 1146 includes data 1148, terminal ID 1150, sector ID 1152, uplink channel information 1154, downlink channel information 1156, and mode information 1158.

Routines 1118 include communications routines 1122 and base station control routines 1124. Base station control routines 1124 includes a scheduler module 1126 and signaling routines 1128 including a tone subset allocation routine 1130 for strip-symbol periods, other downlink tone allocation hopping routine 1132 for the rest of symbol periods, e.g., non strip-symbol periods, and a beacon routine 1134.

Data 1136 includes data to be transmitted that will be sent to encoder 1114 of transmitter 1104 for encoding prior to transmission to WTs, and received data from WTs that has been processed through decoder 1112 of receiver 1102 following reception. Downlink strip-symbol time information 1140 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1142 includes information including a carrier frequency assigned to the base station 1100, the number and frequency of tones, and the set of tone subsets to be allocated to the strip-symbol periods, and other cell and sector specific values such as slope, slope index and sector type.

Data 1148 may include data that WT1 1200 has received from a peer node, data that WT 1 1200 desires to be transmitted to a peer node, and downlink channel quality report feedback information. Terminal ID 1150 is a base station 1100 assigned ID that identifies WT 1 1200. Sector ID 1152 includes information identifying the sector in which WT1 1200 is operating. Sector ID 1152 can be used, for example, to determine the sector type. Uplink channel information 1154 includes information identifying channel segments that have been allocated by scheduler 1126 for WT1 1200 to use, e.g., uplink traffic channel segments for data, dedicated uplink control channels for requests, power control, timing control, etc. Each uplink channel assigned to WT1 1200 includes one or more logical tones, each logical tone following an uplink hopping sequence. Downlink channel information 1156 includes information identifying channel segments that have been allocated by scheduler 1126 to carry data and/or information to WT1 1200, e.g., downlink traffic channel segments for user data. Each downlink channel assigned to WT1 1200 includes one or more logical tones, each following a downlink hopping sequence. Mode information 1158 includes information identifying the state of operation of WT1 1200, e.g. sleep, hold, on.

Communications routines 1122 control the base station 1100 to perform various communications operations and implement various communications protocols. Base station control routines 1124 are used to control the base station 1100 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1128 controls the operation of receiver 1102 with its decoder 1112 and transmitter 1104 with its encoder 1114. The signaling routine 1128 is responsible controlling the generation of transmitted data 1136 and control information. Tone subset allocation routine 1130 constructs the tone subset to be used in a strip-symbol period using the method of the aspect and using data/info 1120 including downlink strip-symbol time info 1140 and sector ID 1152. The downlink tone subset allocation sequences will be different for each sector type in a cell and different for adjacent cells. The WTs 1200 receive the signals in the strip-symbol periods in accordance with the downlink tone subset allocation sequences; the base station 1100 uses the same downlink tone subset allocation sequences in order to generate the transmitted signals. Other downlink tone allocation hopping routine 1132 constructs downlink tone hopping sequences, using information including downlink tone information 1142, and downlink channel information 1156, for the symbol periods other than the strip-symbol periods. The downlink data tone hopping sequences are synchronized across the sectors of a cell. Beacon routine 1134 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 12:
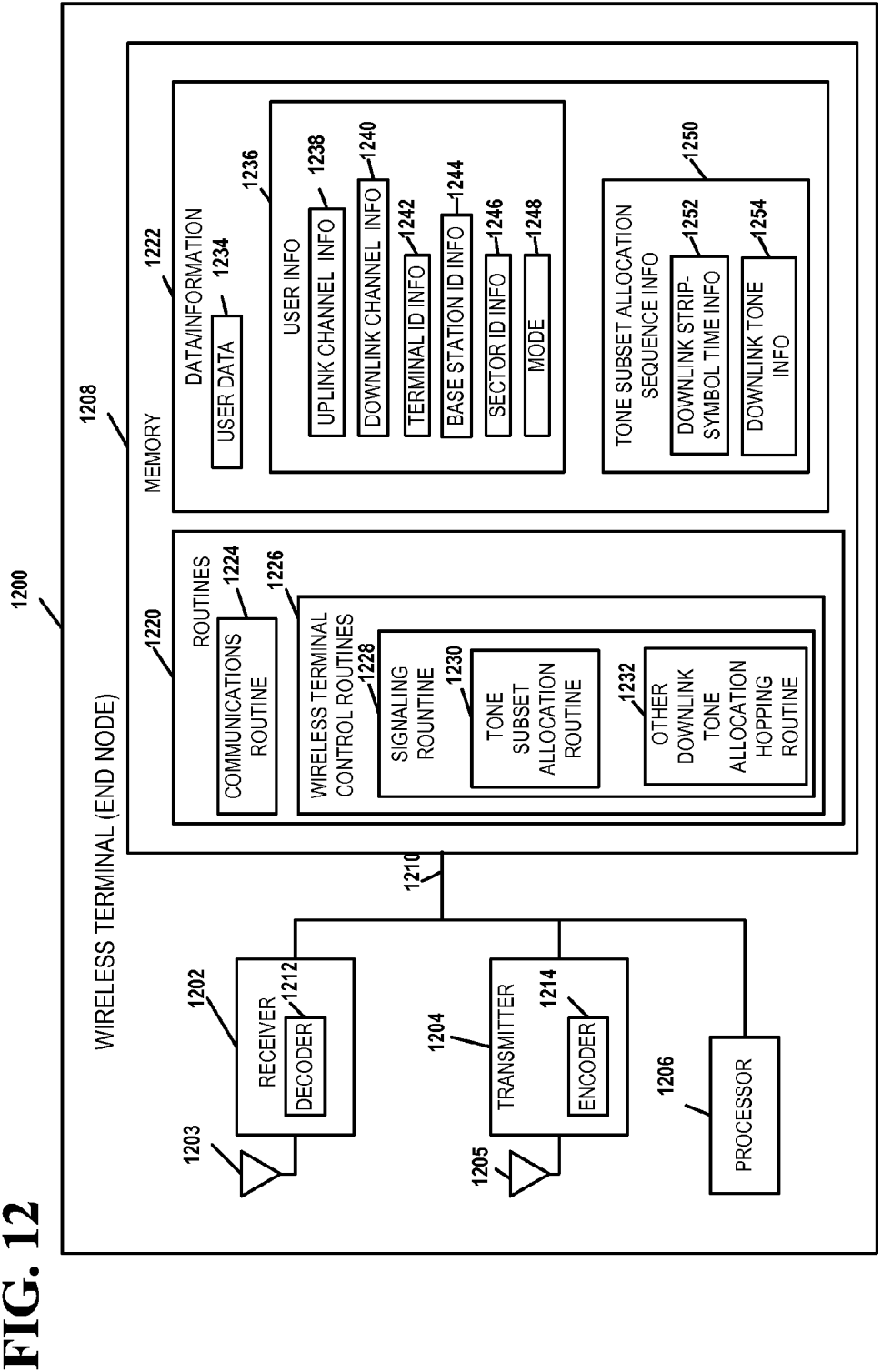
FIG. 12 is an illustration of an exemplary wireless terminal implemented in accordance with various aspects described herein.

FIG. 12 illustrates an example wireless terminal (end node) 1200 which can be used as any one of the wireless terminals (end nodes), e.g., EN(1) 1036, of the system 1000 shown in FIG. 10. Wireless terminal 1200 implements the tone subset allocation sequences. The wireless terminal 1200 includes a receiver 1202 including a decoder 1212, a transmitter 1204 including an encoder 1214, a processor 1206, and memory 1208 which are coupled together by a bus 1210 over which the various elements 1202, 1204, 1206, 1208 can interchange data and information. An antenna 1203 used for receiving signals from a base station (and/or a disparate wireless terminal) is coupled to receiver 1202. An antenna 1205 used for transmitting signals, e.g., to a base station (and/or a disparate wireless terminal) is coupled to transmitter 1204.

The processor 1206, e.g., a CPU controls the operation of the wireless terminal 1200 and implements methods by executing routines 1220 and using data/information 1222 in memory 1208.

Data/information 1222 includes user data 1234, user information 1236, and tone subset allocation sequence information 1250. User data 1234 may include data, intended for a peer node, which will be routed to encoder 1214 for encoding prior to transmission by transmitter 1204 to a base station, and data received from the base station which has been processed by the decoder 1212 in receiver 1202. User information 1236 includes uplink channel information 1238, downlink channel information 1240, terminal ID information 1242, base station ID information 1244, sector ID information 1246, and mode information 1248. Uplink channel information 1238 includes information identifying uplink channels segments that have been assigned by a base station for wireless terminal 1200 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1240 includes information identifying downlink channel segments that have been assigned by a base station to WT 1200 for use when the base station is transmitting data/information to WT 1200. Downlink channels may include downlink traffic channels and assignment channels, each downlink channel including one or more logical tone, each logical tone following a downlink hopping sequence, which is synchronized between each sector of the cell.

User info 1236 also includes terminal ID information 1242, which is a base station-assigned identification, base station ID information 1244 which identifies the specific base station that WT has established communications with, and sector ID info 1246 which identifies the specific sector of the cell where WT 1200 is presently located. Base station ID 1244 provides a cell slope value and sector ID info 1246 provides a sector index type; the cell slope value and sector index type may be used to derive tone hopping sequences. Mode information 1248 also included in user info 1236 identifies whether the WT 1200 is in sleep mode, hold mode, or on mode.

Tone subset allocation sequence information 1250 includes downlink strip-symbol time information 1252 and downlink tone information 1254. Downlink strip-symbol time information 1252 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1254 includes information including a carrier frequency assigned to the base station, the number and frequency of tones, and the set of tone subsets to be allocated to the strip-symbol periods, and other cell and sector specific values such as slope, slope index and sector type.

Routines 1220 include communications routines 1224 and wireless terminal control routines 1226. Communications routines 1224 control the various communications protocols used by WT 1200. Wireless terminal control routines 1226 controls basic wireless terminal 1200 functionality including the control of the receiver 1202 and transmitter 1204. Wireless terminal control routines 1226 include the signaling routine 1228. The signaling routine 1228 includes a tone subset allocation routine 1230 for the strip-symbol periods and an other downlink tone allocation hopping routine 1232 for the rest of symbol periods, e.g., non strip-symbol periods. Tone subset allocation routine 1230 uses user data/info 1222 including downlink channel information 1240, base station ID info 1244, e.g., slope index and sector type, and downlink tone information 1254 in order to generate the downlink tone subset allocation sequences in accordance with some aspects and process received data transmitted from the base station. Other downlink tone allocation hopping routine 1230 constructs downlink tone hopping sequences, using information including downlink tone information 1254, and downlink channel information 1240, for the symbol periods other than the strip-symbol periods. Tone subset allocation routine 1230, when executed by processor 1206, is used to determine when and on which tones the wireless terminal 1200 is to receive one or more strip-symbol signals from the base station 1100. The uplink tone allocation hopping routine 1230 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates positioning of an access point base station, the method comprising:
   monitoring a performance parameter of a communication between a user equipment and the access point base station; and
   assessing, by a processor of the access point base station, a position of the access point base station based on the performance parameter.

2. The method of claim 1, wherein the monitoring further comprises monitoring a transmit power utilized by the access point base station, and wherein the performance parameter is based on a metric associated with the transmit power.

3. The method of claim 2, wherein the monitoring further comprises performing a comparison between the transmit power utilized by the access point base station and a corresponding received power at the user equipment, and wherein the performance parameter is based on the comparison.

4. The method of claim 1, wherein the monitoring further comprises monitoring a communication quality between the user equipment and the access point base station, and wherein the performance parameter is based on a metric associated with the communication quality.

5. The method of claim 4, wherein the communication quality is associated with at least one of a number of dropped communications, a data throughput, or a connection setup time.

6. The method of claim 1, wherein the monitoring further comprises monitoring an interference level at the access point base station, and wherein the performance parameter is based on a metric associated with the interference level.

7. The method of claim 1, wherein the user equipment is included in a set of pre-authorized user equipment, and wherein the monitoring further comprises monitoring a number of handovers performed on entities in relation to the set of pre-authorized user equipment.

8. The method of claim 7, wherein the performance parameter is based on a metric associated with the number of handovers performed on the entities outside or within the set of pre-authorized user equipment.

9. The method of claim 1, wherein the assessing further comprises ascertaining whether the position is a sub-optimal position.

10. The method of claim 1, wherein the assessing further comprises ascertaining whether the position is an adequate position, and wherein the ascertaining is based on a comparison between the performance parameter and a performance threshold.

11. An apparatus of an access point base station configured to facilitate positioning of the access point base station, the apparatus comprising:
    a processor configured to execute computer executable components stored in memory, the components including:
    a communication component configured to facilitate a communication between a user equipment and the access point base station;
    a performance component configured to monitor a performance parameter associated with the communication; and
    an assessment component configured to assess a position of the access point base station based on the performance parameter.

12. The apparatus of claim 11, wherein the performance component is configured to ascertain a transmit power utilized by the access point base station, and wherein the performance parameter is based on a metric associated with the transmit power.

13. The apparatus of claim 12, wherein the performance component is configured to perform a comparison between the transmit power utilized by the access point base station and a corresponding received power at the user equipment, and wherein the performance parameter is based on the comparison.

14. The apparatus of claim 11, wherein the performance component is configured to ascertain a communication quality between the user equipment and the access point base station, and wherein the performance parameter is based on a metric associated with the communication quality.

15. The apparatus of claim 14, wherein the communication quality is associated with at least one of a number of dropped communications, a data throughput, or a connection setup time.

16. The apparatus of claim 11, wherein the performance component is configured to ascertain an interference level at the access point base station, and wherein the performance parameter is based on a metric associated with the interference level.

17. The apparatus of claim 11, wherein the user equipment is included in a set of pre-authorized user equipment, and wherein the performance component is configured to ascertain a number of handovers performed on entities in relation to the set of pre-authorized user equipment.

18. The apparatus of claim 17, wherein the performance parameter is based on a metric associated with the number of handovers performed on the entities outside or within the set of pre-authorized user equipment.

19. The apparatus of claim 11, wherein the assessment component is configured to ascertain whether the position is a sub-optimal position.

20. The apparatus of claim 11, wherein the assessment component is configured to ascertain whether the position is an adequate position based on a comparison between the performance parameter and a performance threshold.

21. A computer program product that facilitates positioning of an access point base station, comprising:
    a non-transitory computer-readable storage medium comprising code for causing at least one computer of the access point base station to:
    monitor a performance parameter of a communication between a user equipment and the access point base station; and
    assess a position of the access point base station based on the performance parameter.

22. The computer program product of claim 21, wherein the code further causes the at least one computer to ascertain an interference level at the access point base station, and wherein the performance parameter is based on a metric associated with the interference level.

23. The computer program product of claim 21, wherein the user equipment is included in a set of pre-authorized user equipment, and wherein the code further causes the at least one computer to ascertain a number of handovers performed on entities in relation to the set of pre-authorized user equipment.

24. The computer program product of claim 23, wherein the performance parameter is based on a metric associated with the number of handovers performed on the entities outside or within the set of pre-authorized user equipment.

25. The computer program product of claim 21, wherein the code further causes the at least one computer to ascertain whether the position is a sub-optimal position.

26. The computer program product of claim 21, wherein the code further causes the at least one computer to ascertain whether the position is an adequate position based on a comparison between the performance parameter and a performance threshold.

27. An apparatus of an access point base station configured to facilitate positioning of the access point base station, the apparatus comprising:
    means for monitoring a performance parameter of a communication between a user equipment and the access point base station; and
    means for assessing a position of the access point base station based on the performance parameter.

28. The apparatus of claim 27, wherein the means for monitoring the performance parameter further comprise a means for ascertaining a transmit power utilized by the access point base station, and wherein the performance parameter is based on a metric associated with the transmit power.

29. The apparatus of claim 28, wherein the means for ascertaining a transmit power utilized by the access point base station further comprise a means for performing a comparison between the transmit power utilized by the access point base station and a corresponding received power at the user equipment, and wherein the performance parameter is based on the comparison.

30. The apparatus of claim 27, wherein the means for monitoring the performance parameter further comprise a means for ascertaining a communication quality between the user equipment and the access point base station, and wherein the performance parameter is based on a metric associated with the communication quality.

31. The apparatus of claim 30, wherein the communication quality is associated with at least one of a number of dropped communications, a data throughput, or a connection setup time.

32. A method that facilitates positioning of an access point base station, comprising:
    assessing, by a processor of the access point base station, a location of the access point base station; and
    communicating an assessment of the location.

33. The method of claim 32, wherein the communicating further comprises providing a light indication.

34. The method of claim 33, wherein the communicating further comprises flashing the light indication according to a flash frequency associated with the assessment.

35. The method of claim 33, wherein the communicating further comprises flashing the light indication according to a color scheme associated with the assessment.

36. The method of claim 32, wherein the communicating further comprises providing an audio indication.

37. The method of claim 36, wherein the communicating further comprises beeping the audio indication at a beep frequency associated with the assessment.

38. The method of claim 32, wherein the communicating further comprises transmitting the assessment via at least one of an e-mail or a short message service.

39. The method of claim 32, wherein the communicating further comprises providing the assessment to a network entity associated with the access point base station.

40. The method of claim 32, wherein the communicating further comprises indicating whether the location is a sub-optimal location.

41. The method of claim 32, wherein the communicating further comprises indicating whether a performance parameter associated with the location exceeds a performance threshold.

42. The method of claim 32, wherein the communicating further comprises indicating a particular problem type associated with the location.

43. An apparatus of an access point base station configured to facilitate positioning of an access point base station, the apparatus comprising:
    a processor configured to execute computer executable components stored in memory, the components including:
    an assessment component configured to assess a location of the access point base station; and a communication component configured to communicate an assessment of the location.

44. The apparatus of claim 43, wherein the communication component is configured to provide a light indication.

45. The apparatus of claim 44, wherein the communication component is configured to flash the light indication according to a flash frequency associated with the assessment.

46. The apparatus of claim 44, wherein the communication component is configured to flash the light indication according to a color scheme associated with the assessment.

47. The apparatus of claim 43, wherein the communication component is configured to provide an audio indication.

48. The apparatus of claim 47, wherein the communication component is configured to beep the audio indication at a beep frequency associated with the assessment.

49. The apparatus of claim 43, wherein the communication component is configured to transmit the assessment via least one of an e-mail or a short message service.

50. The apparatus of claim 43, wherein the communication component is configured to provide the assessment to a network entity associated with the access point base station.

51. The apparatus of claim 43, wherein the communication component is configured to indicate whether the location is a sub-optimal location.

52. The apparatus of claim 43, wherein the communication component is configured to indicate whether a performance parameter associated with the location exceeds a performance threshold.

53. The apparatus of claim 43, wherein the communication component is configured to indicate a particular problem type associated with the location.

54. A computer program product that facilitates positioning of an access point base station, comprising:
a non-transitory computer-readable storage medium comprising code for causing at least one computer of the access point base station to:
assess a location of the access point base station; and
communicate an assessment of the location.

55. The computer program product of claim 54, wherein the code further causes the at least one computer to communicate the assessment by providing a light indication.

56. The computer program product of claim 54, wherein the code further causes the at least one computer to communicate the assessment via least one of an e-mail or a short message service.

57. The computer program product of claim 54, wherein the code further causes the at least one computer to communicate the assessment to a network entity associated with the access point base station.

58. The computer program product of claim 54, wherein the code further causes the at least one computer to indicate whether the location is a sub-optimal location.

59. The computer program product of claim 54, wherein the code further causes the at least one computer to indicate whether a performance parameter associated with the location exceeds a performance threshold.

60. The computer program product of claim 54, wherein the code further causes the at least one computer to indicate a particular problem type associated with the location.

61. An apparatus of an access point base station configured to facilitate positioning of the access point base station, the apparatus comprising:
means for assessing a location of the access point base station; and
means for communicating an assessment of the location.

62. The apparatus of claim 61, wherein the means for communicating the assessment further comprise a means for providing a light indication.

63. The apparatus of claim 62, wherein the means for providing the light indication further comprise a means for flashing the light indication according to a flash frequency associated with the assessment.

64. The apparatus of claim 62, wherein the means for providing the light indication further comprise a means for flashing the light indication according to a color scheme associated with the assessment.

65. The apparatus of claim 61, wherein the means for communicating the assessment further comprise a means for providing an audio indication.

66. The apparatus of claim 65, wherein the means for providing the audio indication further comprise a means for beeping the audio indication at a beep frequency associated with the assessment.

* * * * *